(12) United States Patent
Deselaers et al.

(10) Patent No.: US 10,261,685 B2
(45) Date of Patent: Apr. 16, 2019

(54) MULTI-TASK MACHINE LEARNING FOR PREDICTED TOUCH INTERPRETATIONS

(71) Applicant: Google Inc., Mountain View, CA (US)

(72) Inventors: Thomas Deselaers, Zurich (CH); Victor Carbune, Basel (CH)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/393,611

(22) Filed: Dec. 29, 2016

(65) Prior Publication Data
US 2018/0188938 A1 Jul. 5, 2018

(51) Int. Cl.
*G06N 3/02* (2006.01)
*G06F 3/041* (2006.01)
*G06F 3/044* (2006.01)
*G06F 3/045* (2006.01)
*G06N 99/00* (2010.01)
*G06F 3/0488* (2013.01)

(52) U.S. Cl.
CPC ........ *G06F 3/04883* (2013.01); *G06F 3/0418* (2013.01); *G06N 3/02* (2013.01); *G06N 99/005* (2013.01); *G06F 3/044* (2013.01); *G06F 3/045* (2013.01)

(58) Field of Classification Search
None
See application file for complete search history.

(56) References Cited

U.S. PATENT DOCUMENTS

| 8,194,926 | B1 | 6/2012 | Keysers et al. | |
|---|---|---|---|---|
| 8,717,303 | B2 | 5/2014 | Ludwig | |
| 2008/0111710 | A1* | 5/2008 | Boillot | G06F 3/017 341/22 |
| 2009/0006292 | A1 | 1/2009 | Block | |
| 2012/0007821 | A1* | 1/2012 | Zaliva | G06F 3/03547 345/173 |
| 2012/0056846 | A1 | 3/2012 | Zaliva | |
| 2013/0009896 | A1 | 1/2013 | Zaliva | |
| 2013/0241887 | A1 | 9/2013 | Sharma | |

(Continued)

OTHER PUBLICATIONS

International Search Report for PCT/US2017/053949 dated Dec. 6, 2017, 14 pages.

(Continued)

*Primary Examiner* — Chad M Dicke
(74) *Attorney, Agent, or Firm* — Dority & Manning, P.A.

(57) ABSTRACT

The present disclosure provides systems and methods that leverage machine learning to predict multiple touch interpretations. In particular, the systems and methods of the present disclosure can include and use a machine-learned touch interpretation prediction model that has been trained to receive touch sensor data indicative of one or more locations of one or more user input objects relative to a touch sensor at one or more times and, in response to receipt of the touch sensor data, provide one or more predicted touch interpretation outputs. Each predicted touch interpretation output corresponds to a different type of predicted touch interpretation based at least in part on the touch sensor data. Predicted touch interpretations can include a set of touch point interpretations, a gesture interpretation, and/or a touch prediction vector for one or more future times.

20 Claims, 9 Drawing Sheets

(56) References Cited

U.S. PATENT DOCUMENTS

2014/0198052 A1\* 7/2014 Tokutake ............... G06F 3/041
  345/173
2017/0251081 A1\* 8/2017 Roychowdhury ...... H04L 67/42

OTHER PUBLICATIONS

Erhan et al., "Scalable Object Detection using Deep Neural Networks", Proceedings of the 2014 IEEE Conference on Computer Vision and Pattern Recognition, Columbus, Ohio, Jun. 23-28, 2014, pp. 2155-2162.
Lu et al., "GestureScript: Recognizing Gestures and Their Structure using Rendering Scripts and Interactively Trained Parts", Proceedings of the SIGCHI Conference on Human Factors in Computing Systems, Toronto, Ontario, Canada, Apr. 26-May 1, 2014, pp. 1685-1694.
Miluzzo et al., "TapPrints: Your Finger Taps Have Fingerprints", Proceedings of the 10$^{th}$ International Conference on Mobile Systems, Applications and Services, Low Wood Bay, Lake District, United Kingdom, Jun. 25-29, 2012, pp. 323-336.
Szegedy et al., "Scalable High Quality Object Detection", arXiv: 1412.1441v3 [cs.CV[ Dec. 9, 2015, 10 pages.

\* cited by examiner

MULTI-TASK MACHINE LEARNING FOR PREDICTED TOUCH INTERPRETATIONS

FIELD

The present disclosure relates generally to machine learning. More particularly, the present disclosure relates to systems and methods that leverage multi-task machine learning to determine touch points and other touch interpretations.

BACKGROUND

A user can provide user input to a computing device using a user input object, such as, for example, one or more fingers, a stylus operated by the user, or other user input objects. In particular, in one example, a user can use a user input object to touch a touch-sensitive display screen or other touch-sensitive component. The interaction of the user input object with the touch-sensitive display screen enables the user to provide user input to the computing device in the form of raw touch sensor data.

In certain existing computing devices, touch sensor data can be directly interpreted into 0, 1, or more "touch points" using simple heuristics on a digital signal processor associated with the touch sensor. Conventional analysis used to determine whether or not the touch sensor data results in a touch point determination can limit the types of interpretation that are possible. In some examples, the touch point determinations in such existing computing devices analyze touch sensor data using a limited number of fixed processing rules. The processing rules are sometimes incapable of being revised to adapt to new technologies as well as being customized for particular touch patterns relative to different users. Further, any additional analysis of the determined touch points involves the subsequent use of additional processing rules. Still further, touch point determinations in existing computing devices discard a substantial amount of raw touch sensor data after the touch point determinations, thus preventing the possibility of further processing of the raw touch sensor data.

SUMMARY

Aspects and advantages of embodiments of the present disclosure will be set forth in part in the following description, or can be learned from the description, or can be learned through practice of the embodiments.

One example aspect of the present disclosure is directed to a computing device that determines touch interpretation from user input objects. The computing device includes at least one processor, a machine-learned touch interpretation prediction model, and at least one tangible, non-transitory computer-readable medium that stores instructions that, when executed by the at least one processor, cause the at least one processor to perform operations. The touch interpretation prediction model has been trained to receive raw touch sensor data indicative of one or more locations of one or more user input objects relative to a touch sensor at one or more times and, in response to receipt of the raw touch sensor data, output one or more predicted touch interpretations. The operations include obtaining a first set of raw touch sensor data indicative of one or more user input object locations relative to a touch sensor over time. The operations also include inputting the first set of raw touch sensor data into the machine-learned touch interpretation prediction model. The operations also include receiving, as an output of the touch interpretation prediction model, one or more predicted touch interpretations that describe predicted intentions of the one or more user input objects.

Another example aspect of the present disclosure is directed to a one or more tangible, non-transitory computer-readable media storing computer-readable instructions that when executed by one or more processors cause the one or more processors to perform operations. The operations include obtaining data descriptive of a machine-learned touch interpretation prediction model. The touch interpretation prediction model has been trained to receive touch sensor data indicative of one or more locations of one or more user input objects relative to a touch sensor at one or more times and, in response to receipt of the touch sensor data, provide multiple predicted touch interpretation outputs. Each predicted touch interpretation output corresponds to a different type of predicted touch interpretation based at least in part on the touch sensor data. The operations also include obtaining a first set of touch sensor data indicative of one or more user input object locations relative to a touch sensor over time. The operations also include inputting the first set of touch sensor data into the machine-learned touch interpretation prediction model. The operations also include receiving, as an output of the touch interpretation prediction model, multiple predicted touch interpretations, each predicted touch interpretation describing a different predicted aspect of the one or more user input objects. The operations also include performing one or more actions associated with the multiple predicted touch interpretations.

Another example aspect of the present disclosure is directed to a mobile computing device that determines touch interpretation from user input objects. The mobile computing device includes a processor and at least one tangible, non-transitory computer-readable medium that stores instructions that, when executed by the at least one processor, cause the at least one processor to perform operations. The operations include obtaining data descriptive of a machine-learned touch interpretation prediction model that comprises a neural network. The touch interpretation prediction model has been trained to receive raw touch sensor data indicative of one or more locations of one or more user input objects relative to a touch sensor at one or more times and, in response to receipt of the raw touch sensor data, output two or more predicted touch interpretations. The operations also include obtaining a first set of raw touch sensor data associated with the one or more user input objects, the first set of raw touch sensor data descriptive of a location of the one or more user input objects over time. The operations also include inputting the first set of raw touch sensor data into the machine-learned touch interpretation prediction model. The operations also include receiving, as an output of the touch interpretation prediction model, two or more predicted touch interpretations that describe one or more predicted intentions of the one or more user input objects. The two or more predicted touch interpretations include a set of touch point interpretations that respectively describe one or more intended touch points and a gesture interpretation that characterizes the set of touch point interpretations as a gesture determined from a predefined gesture class.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Figure 1:
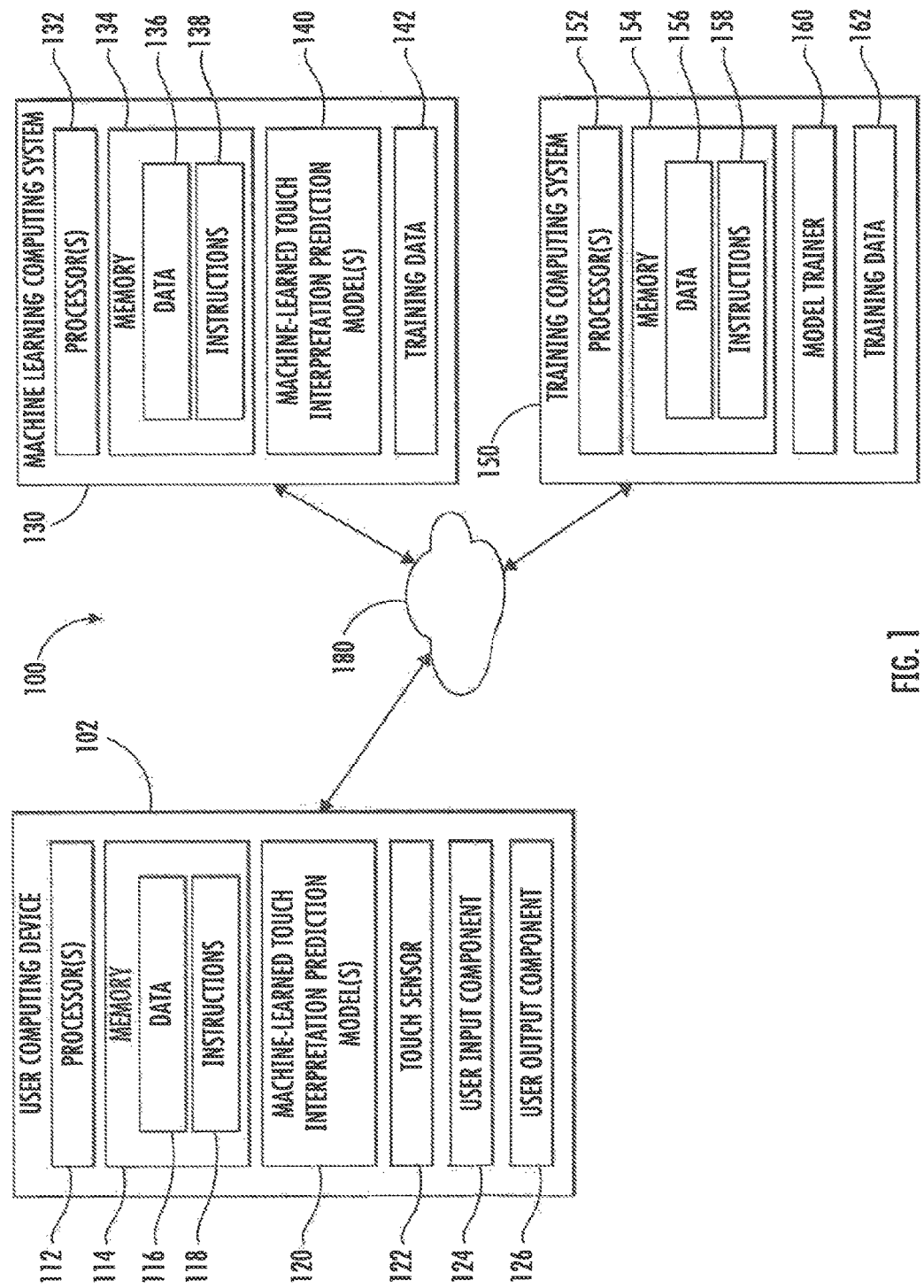
FIG. 1 depicts a block diagram of an example computing system that performs machine learning according to example embodiments of the present disclosure.

Generally, the present disclosure is directed to systems and methods that leverage machine learning to implement touch interpretation. In particular, the systems and methods of the present disclosure can include and use a machine-learned touch interpretation prediction model that has been trained to receive raw touch sensor data indicative of measured touch sensor readings across a grid of points generated in response to the location of one or more user input objects relative to a touch sensor, and, in response to receipt of the raw touch sensor data, output multiple predicted touch interpretations. In some examples, the machine-learned touch interpretation prediction model has been trained to simultaneously output at least a first predicted touch interpretation and a second predicted touch interpretation. The multiple predicted touch interpretations can include, for example, a set of touch point interpretations that respectively describe one or more intended touch points, a gesture interpretation that characterizes at least a portion of the raw touch sensor data as a gesture determined from a predefined gesture class, and/or a touch prediction vector that describes one or more predicted future locations of the one or more user input objects respectively for one or more future times. The touch interpretation prediction model can include a single input layer but then provide the multiple predicted touch interpretations at multiple different and discrete output layers, which share the same input layer and sometimes additional layers between the input and output layers. By using multi-task learning to predict multiple touch interpretations based on the same set of input data (e.g., raw touch sensor data that is not discarded after initial touch point processing), commonalities and differences across the different touch interpretations can be leveraged to provide increased accuracy levels for outputs of the machine-learned touch interpretation prediction model. Using the raw touch sensor data to directly predict user intent also can provide more efficient and more accurate touch sensor evaluation compared to systems that use multiple sequential steps of data processing and potentially multiple disjoint models to make predictions. Given the determined predicted touch interpretations, applications or other components that consume data from the touch sensors can have improved responsiveness, reduced latency, and more customizable interaction. For example, mobile devices (e.g., smartphones) or other computing devices that employ touch sensor inputs can benefit from the availability of the predicted touch interpretations.

In one example, a user computing device (e.g., a mobile computing device such as a smartphone) can obtain raw touch sensor data indicative of measured touch sensor readings across a grid of points generated in response to the location of one or more user input objects relative to a touch sensor (e.g., the touch-sensitive display screen or other user input component). Raw touch sensor data can, for example, correspond to voltage levels registered by capacitance change across the surface of a capacitive touch-sensitive display screen or resistance change across the surface of a resistive touch-sensitive display screen. Example user input objects can include one or more fingers, thumbs or hands of a user, a stylus operated by the user, or other user input objects. In particular, in one example, the user can employ a user input object to touch a touch-sensitive display screen or other touch-sensitive component of the computing device. Touch and/or motion of the user input object relative to the touch-sensitive display screen can enable the user to provide user input to the computing device.

In some examples, raw touch sensor data provided as input to the touch interpretation prediction model can include one or more entries of user input object location and time. For example, the set of raw touch sensor data can include one or more entries that provide the location of one or more user input objects in both the x and y dimensions and also a timestamp associated with each location. As another example, raw touch sensor data can include one or more entries that describe a change in the location of one or more user input objects in both the x and y dimensions and also a timestamp or change in time associated with each pair of changes in x and y values. In some implementations, the set of touch sensor data can be iteratively updated, refreshed, or generated as additional touch sensor data is detected.

In some implementations, the raw touch sensor data provided as input to the touch interpretation prediction model can be provided as a time-stepped sequence of T inputs, each input corresponding to raw touch sensor data obtained at a different time step. For instance, touch sensors can be continuously monitored such that a time-stepped sequence of raw touch sensor data can be obtained iteratively in real time or near real time from a touch sensor. For example, raw touch sensor data can be provided as a time series $Z_1, Z_2, \ldots, Z_T$ of sensor readings. In some examples, the time difference between the T different sample times (e.g., $t_1, t_2, \ldots, t_T$) can be the same or it can be different. Each sensor reading can be an array of points having a generally rectangular shape characterized by a first dimension (e.g., x) and a second dimension (e.g., y). For example, each sensor reading at time t can be represented as $Z_t = z_{xyt}$ for $x \in 1 \ldots W$, $y \in 1 \ldots H$, $t \in 1 \ldots T$, where $z_{xyt}$ is the raw sensor measurement of the touch sensor at position (x,y) at time t for a sensor size of W×H points. Each sensor reading iteratively obtained at a different time step can be iteratively provided to a single machine-learned model that has been trained to compute multiple touch interpretations in response to the mapped array of raw touch sensor data.

In some implementations, a computing device can feed the raw touch sensor data as input to the machine-learned touch interpretation prediction model in an online manner. For example, during use in an application, the latest touch sensor data update (e.g., values for changes in x, y, and time) can be fed into the touch interpretation prediction model upon each instance in which an update is received from the relevant touch sensor(s) (e.g., touch-sensitive display screen). Thus, raw touch sensor data collection and touch interpretation prediction can be performed iteratively as additional touch sensor data is collected. As such, one benefit provided by the use of machine learned models (e.g., recurrent neural networks) is the ability to maintain context from previous updates as new touch sensor updates are input in the online manner described above.

According to an aspect of the present disclosure, a user computing device (e.g., a mobile computing device such as a smartphone) can input the raw touch sensor data into the machine-learned touch interpretation prediction model. In some implementations, the machine-learned touch interpretation prediction model can include a neural network and inputting the raw touch sensor data includes inputting the raw touch sensor data into the neural network of the machine-learned touch interpretation prediction model. In some implementations, the touch interpretation prediction model can include a convolutional neural network. In some implementations, the touch interpretation prediction model can be a temporal model that allows the raw touch sensor data to be referenced in time. In such instances, a neural network within the touch interpretation prediction model can be a recurrent neural network (e.g., a deep recurrent neural network). In some examples, a neural network within the touch interpretation prediction model is a long short-term memory (LSTM) neural network, a gated recurrent unit (GRU) neural network, or other form of recurrent neural network.

According to another aspect of the present disclosure, a user computing device (e.g., a mobile computing device such as a smartphone) can receive, as an output of the machine-learned touch interpretation prediction model, one or more predicted touch interpretations that describe one or more predicted intentions of the one or more user input objects. In some implementations, the machine-learned touch interpretation model outputs multiple predicted touch interpretations. In some instances, the machine-learned touch interpretation prediction model has been trained to simultaneously output at least a first predicted touch interpretation and a second predicted touch interpretation. In some implementations, the multiple predicted touch interpretations can be provided by the touch interpretation prediction model at different and distinct output layers. However, the different output layers can be downstream from and include at least one shared layer (e.g., the input layer and one or more shared layers thereafter). As such, a machine-learned touch interpretation prediction model can include at least one shared layer and multiple different and distinct output layers positioned structurally after the at least one shared layer. One or more computing devices can obtain and input raw touch sensor data into the at least one shared layer, while the multiple output layers can be configured to respectively provide the multiple predicted touch interpretations.

In some implementations, the predicted touch interpretations can include a set of touch point interpretations that respectively describe zero (0), one (1), or more intended touch points. Unintended touch points can also be identified directly or can be inferred by their exclusion from the list of intended touch points. For instance, a set of touch point interpretations that describe intended touch points can be output as a potentially empty set of intended touch points, each touch point represented as a two-dimensional coordinate pair (x, y) for up to N different touch points (e.g., $(x, y)_1 \ldots (x, y)_N$). In some implementations, additional data could accompany each identified touch point in the set of touch point interpretations. For instance, in addition to a location of each intended touch point, the set of touch point interpretations can also include an estimated pressure of the touch at each touch point and/or a touch type describing a predicted type of user input object associated with each touch point (e.g., which finger, knuckle, palm, stylus, etc. was predicted to cause the touch), and/or a user input object radius on the touch-sensitive display screen, and/or other user input object parameters.

In some implementations, the set of touch point interpretations is intended to include intended touch points and exclude unintended touch points. Unintended touch points can include, for example, accidental and/or undesired touch locations on a touch-sensitive display screen or component. Unintended touch points can arise from a number of circumstances, for example, touch sensor noise at one or more points, a manner of holding a mobile computing device that results in inadvertent touching on certain portions of the touch sensor surface, pocket dialing or inadvertent picture taking, and the like. For instance, unintended touch points can arise when a user holds a mobile device (e.g., a smartphone) with a first hand while providing user input to a touch-sensitive display screen with a second hand. Portions of the first hand (e.g., a palm and/or thumb of a user) can sometimes provide input to the touch-sensitive display screen around the edges of the display screen corresponding to unintended touch points. This situation can be especially prevalent for mobile computing devices having relatively smaller bezels around the outer periphery of such devices.

In some implementations, the predicted touch interpretations can include a gesture interpretation that characterizes at least a portion of the raw touch sensor data (and additionally or alternatively the previously predicted set of touch point interpretations and/or a touch prediction vector, etc.) as a gesture determined from a predefined gesture class. In some implementations, a gesture interpretation can be based at least in part on the last $\delta$ steps of raw touch sensor data. Example gestures can include, but are not limited to no recognized gesture, a click/press gesture (e.g., including a hard click/press, a soft click/press, a short click/press, and/or a long click/press), a tap gesture, a double tab gesture for selecting or otherwise interacting with one or more items displayed on a user interface, a scroll gesture or swipe gesture for translating a user interface in one or more directions and/or transitioning a user interface screen from one mode to another, a pinch gesture for zooming in or out relative to a user interface, a drawing gesture for drawing a line or typing a word, and/or others. In some implementations, a predefined gesture class from which gesture interpretations are determined can be or otherwise include a set of gestures associated with a specialized accessibility mode (e.g., a visually impaired interface mode by which a user interacts using Braille or other specialized writing style characters).

In some implementations, if at least a portion of the raw touch sensor data is characterized as an interpreted gesture, the gesture interpretation can include information identifying not only the type of gesture, but additionally or alternatively the location of the gesture. For instance, a gesture interpretation may take the form of a three-dimensional dataset (e.g., (c, x, y)), where c is the predefined gesture class (e.g., "not a gesture", "tap", "swipe", "pinch to zoom", "double tap swipe for zoom", etc.) and x, y are the coordinates in a first (e.g., x) dimension and a second (e.g., y) dimension where the gesture happened on a touch-sensitive display.

In some implementations, the predicted touch interpretations can include an accessibility mode describing a predicted type of interaction of the one or more user input objects determined from a predefined class of accessibility modes including one or more of a standard interface mode and a visually impaired interface mode.

In some examples, the predicted touch interpretations can include a touch prediction vector that describes one or more predicted future locations of the one or more user input objects respectively for one or more future times. In some implementations, each future location of the one or more user input objects can be presented as a sensor reading $Z_{t+\theta}$ depicting the expected pattern on the touch sensor θ time steps in the future. In some examples, the machine-learned touch interpretation prediction model can be configured to generate the touch prediction vector as an output. In some examples, the machine-learned touch interpretation prediction model can additionally or alternatively be configured to receive the determined touch prediction vector as an input to help with related determinations by the machine-learned touch interpretation prediction model of other touch interpretations (e.g., the gesture interpretation, set of touch point interpretations, etc.)

The time steps θ for which a touch prediction vector is determined can be configured in a variety of manners. In some implementations, the machine-learned touch interpretation prediction model can be configured to consistently output the predicted future locations for a predefined set of values θ defining one or more future times. In some implementations, the one or more future times θ can be provided as a separate input to the machine-learned touch interpretation prediction model alongside the raw touch sensor data. For instance, a computing device can input a time vector into the machine-learned touch interpretation prediction model alongside the raw touch sensor data. The time vector can provide a list of time lengths that are desired to be predicted by the touch interpretation prediction model (e.g., 10 ms, 20 ms, etc.). Thus, the time vector can describe one or more future times at which the location of the user input object is to be predicted. In response to receipt of the raw touch sensor data and the time vector, the machine-learned touch interpretation prediction model can output a touch prediction vector that describes a predicted future location of the user input object for each time or time length described by the time vector. For example, the touch prediction vector can include a pair of values for location in the x and they dimensions for each future time or a pair of values for change in the x and they dimensions for each future time.

A computing device can use the touch prediction vector output by the touch interpretation prediction model to reduce or even eliminate touch latency. In particular, the computing device can perform operations responsive to or otherwise based on the predicted future locations of the user input object, thereby eliminating the need to wait to receive and process the remainder of the user input action. To provide an example, a computing device of the present disclosure can input a time-stepped sequence of raw touch sensor data that describes touch locations representative of finger motion associated with an initial portion of a user touch gesture (e.g., an initial portion of a swipe left gesture) into a neural network of a touch interpretation prediction model. In response to receipt of the raw touch sensor data, the touch interpretation prediction model can predict the finger motion/locations associated with the remainder of the user touch gesture (e.g., the remainder of a swipe left gesture). The computing device can perform actions in response to the predicted finger motion/locations (e.g., rendering a display screen in which the displayed object has been swiped left). As such, the computing device is not required to wait for and then process the remainder of the user touch gesture. Therefore, the computing device is able to respond to touch events more quickly and reduce touch latency. For example, high quality gesture predictions can enable touch latency to be reduced to levels that are not perceivable by human users.

By providing a machine-learned model that has been trained to output multiple joint variables, improved determination of some predicted touch interpretations are able to mutually benefit from improved determinations of other predicted touch interpretations. For example, improved determination of a set of touch point interpretations can help improve a determined gesture interpretation. Similarly, improved determination of a touch prediction vector can help improve determination of a set of touch point interpretations. By co-training a machine-learned model across multiple desired outputs (e.g., multiple predicted touch interpretations), an efficient model can generate different output layers that all share the same input layer (e.g., the raw touch sensor data).

According to another aspect of the present disclosure, in some implementations, a touch interpretation prediction model or at least a portion thereof is made available via an application programming interface (API) for one or more applications provided on a computing device. In some instances, a first application uses an API to request access to the machine-learned touch interpretation prediction model. The machine-learned touch interpretation prediction model can be hosted as part of a second application or in a dedicated layer, application, or component within the same computing device as the first application or in a separate computing device. In some implementations, the first application can effectively add custom output layers to the machine-learned touch interpretation prediction model that can be further trained on top of a pre-trained, stable model. Such an API would allow maintaining the benefits of running a single machine-learned model for predicting custom user touch interactions, specifically targeted by the first application, without any additional cost for implicitly obtaining access to a complete set of raw touch sensor data.

In one example, a first application can be designed to predict user touch interactions while operating in a visually impaired interface mode, such as one configured to receive Braille input via the touch-sensitive display or other touch-sensitive component. This type of interface mode can be substantively different than a conventional user interface mode due to reliance on devices having touch sensors that can capture numerous touch points simultaneously. In another example, a first application can be designed to handle specialized inputs from a stylus or handle inputs from a different type of touch sensor that may require adaptation of a touch interpretation prediction model to the new type of touch sensor data received as input by a computing device or touch-sensitive component thereof.

In some examples, an API can allow definition libraries from a machine learning tool such as TensorFlow and/or Theano to be flexibly coupled from the first application to a touch interpretation prediction model in order to specify additional training data paths for a specialized output layer of the touch interpretation prediction model. In such examples, additional training of the specialized output layer(s) and post-training operation can run in parallel with the predefined touch interpretation prediction model at very little additional cost.

According to another aspect of the present disclosure, the touch interpretation prediction models described herein can be trained on ground-truth data using a novel loss function. More particularly, a training computing system can train the touch interpretation prediction models using a training dataset that includes a number of sets of ground-truth data.

In some implementations, when training the machine-learned touch interpretation prediction model to determine a set of touch point interpretations and/or one or more gesture interpretations, a first example training dataset can include touch sensor data and corresponding labels that describe a large number of previously-observed touch interpretations.

In one implementation, the first example training dataset includes a first portion of data corresponding to recorded touch sensor data indicative of one or more user input object locations relative to a touch sensor. The recorded touch sensor data can, for example, be recorded while a user is operating a computing device having a touch sensor under normal operating conditions. The first example training dataset can further include a second portion of data corresponding to labels of determined touch interpretations applied to recorded screen content. The recorded screen content can, for example, be co-recorded at the same time as the first portion of data corresponding to recorded touch sensor data. The labels of determined touch interpretations can include, for example, a set of touch point interpretations and/or gesture interpretations determined at least in part from the screen content. In some instances, the screen content can be labeled manually. In some instances, the screen content can be labeled automatically using conventional heuristics applied to interpret raw touch sensor data. In some instances, screen content can be labeled using a combination of automatic labeling and manual labeling. For instance, cases when a palm is touching a touch-sensitive display screen that prevents the user from using a device in the desired way could be best identified using manually labeling, while other touch types can be potentially identified using automatic labeling.

In other implementations, a first example training dataset can be built using a dedicated data collection application that prompts a user to perform certain tasks relative to the touch-sensitive display screen (e.g., asking a user to "click here" while holding the device in a specific way). Raw touch sensor data can be correlated with touch interpretations identified during operation of the dedicated data collection application to form first and second portions of the first example training dataset.

In some implementations, when training the machine-learned touch interpretation prediction model to determine a touch prediction vector, a second example training dataset can include a first portion of data corresponding to an initial sequence of touch sensor data observations (e.g., $Z_1 \ldots Z_T$) and a second portion of data corresponding to a subsequent sequence of touch sensor data observations (e.g., $Z_{T+1} \ldots Z_{T+F}$). A sequence of sensor data $Z_1 \ldots Z_T$ automatically lends itself to training the prediction of future sensor data $Z_{T+1} \ldots Z_{T+F}$ at one or more future times since predicted steps can be compared to observed steps upon occurrence of the future times. It should be appreciated that any combination of the above-described techniques and others can be used to obtain one or more training datasets for training the machine-learned touch interpretation prediction model.

In some implementations, to train the touch interpretation prediction model, a training computing system can input a first portion of a set of ground-truth data into the touch interpretation prediction model to be trained. In response to receipt of such first portion, the touch interpretation prediction model outputs one or more touch interpretations that predict the remainder of the set of ground-truth data (e.g., the second portion of data). After such prediction, the training computing system can apply or otherwise determine a loss function that compares the one or more touch interpretations output by the touch interpretation prediction model to the remainder of the ground-truth data which the touch interpretation prediction model attempted to predict. The training computing system then can backpropagate the loss function through the touch interpretation prediction model to train the touch interpretation prediction model (e.g, by modifying one or more weights associated with the touch interpretation prediction model).

The systems and methods described herein may provide a number of technical effects and benefits. For instance, the disclosed techniques can improve touch sensor outputs by predicting user intent when interfacing with a touch-sensitive display with increased accuracy. Accuracy levels can be increased due to the machine-learned model's ability to implement multi-task learning. By learning how to predict multiple touch interpretations based on the same set of input data (e.g., raw touch sensor data that is not discarded after initial touch point processing), commonalities and differences across the different touch interpretations can be leveraged. Touch patterns specific to different users can also be identified and used to enhance touch interpretation prediction. More intricate and complex nuances in touch interpretation determinations can thus be afforded using the disclosed machine learning techniques. When machine learned models include deep neural networks as described, the touch interpretations can be predicted using excellent function approximators that offer far richer prediction capabilities as compared to polynomials. As such, the touch interpretation prediction models of the present disclosure can provide superior prediction accuracy if trained properly.

Another example technical effect and benefit of the present disclosure is increased efficiency in determining multiple touch interpretations. Compared with solutions that determine each touch interpretation in a sequentially processed manner (e.g., a first determination of touch points from raw touch sensor data followed by a second separate and subsequent determination of a gesture from the touch points), a jointly trained touch interpretation model that simultaneously provides multiple touch interpretations as outputs can provide more accurate predictions in a more efficient manner. Sequential processing steps for determining touch interpretations not only can take longer but also can have a disadvantage when a final output cannot recover if a mistake is made during one of the earlier steps. The disclosed use of a machine-learned touch interpretation prediction model that simultaneously provides multiple touch interpretation outputs can avoid this potential problem associated with end-to-end processing.

A still further technical effect and benefit of the present disclosure is an enhanced opportunity for determination of specialized touch interpretations in a principled manner. For example, touch point interpretations that also include a predicted touch type for each touch point (e.g., which finger, knuckle, palm, stylus, etc. was predicted to cause the touch) can provide useful information for predicting user intent relative to touch-sensitive display device inputs. An ability to determine touch interpretations in specialized accessibility modes (e.g., a visually impaired mode) significantly broadens the usefulness of the disclosed machine-learned models. The ability to adapt the disclosed machine-learned touch interpretation prediction models to include new output layers provides even further advantages as new touch-based technologies are developed.

In some implementations, such as when a machine-learned touch interpretation prediction model is configured to output a touch prediction vector, the disclosed technology can be used to improve responsiveness during operation of an application. For instance, an application, program, or other component of the computing device (e.g., a handwriting recognition application) can consume or otherwise be provided with the multiple touch interpretations including a touch prediction vector. The application can treat the touch interpretations including the touch prediction vector as if the user input object had already been moved to such predicted locations. For example, the handwriting recognition application can recognize handwriting on the basis of the predicted future locations provided by the touch prediction vector. Therefore, the application does not need to wait for the remainder of the user input action to be received and processed through a large processing stack, thereby reducing latency.

In addition to reduced touch latency, some implementations of the present disclosure can result in a number of additional technical benefits, including, for example, smoother finger tracking, improved handwriting recognition, faster and more precise user control of user-manipulable virtual objects (e.g., objects within a game), and many other benefits in scenarios in which user touch input is provided to the computing device.

Another example technical benefit of the present disclosure is improved scalability. In particular, modeling touch sensor data through neural networks or other machine-learned models greatly reduces the research time needed relative to development of a hand-crafted touch interpretation algorithm. For example, for hand-crafted touch interpretation algorithms, a designer would need to exhaustively derive heuristic models of how different touch patterns correspond with user intent in different scenarios and/or for different users. By contrast, to use neural networks or other machine learning techniques as described herein, a machine-learned touch interpretation prediction model can be trained on appropriate training data, which can be done at a massive scale if the training system permits. In addition, the machine-learned models can easily be revised as new training data is made available.

The systems and methods described herein may also provide a technical effect and benefit of improved computer technology in the form of a relatively low memory usage/requirement. In particular, the neural networks or other machine-learned touch interpretation prediction models described herein effectively summarize the training data and compress it into compact form (e.g., the machine-learned model itself). This greatly reduces the amount of memory needed to store and implement the touch interpretation prediction algorithm(s).

With reference now to the Figures, example embodiments of the present disclosure will be discussed in further detail.

Example Devices and Systems

FIG. 1 depicts an example computing system 100 to predict multiple touch interpretations according to example embodiments of the present disclosure. The system 100 includes a user computing device 102, a machine learning computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 can include one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can include at least one touch sensor 122. The touch sensor 122 can be, for example, a touch-sensitive component (e.g., a touch-sensitive display screen or a touch pad) that is sensitive to the touch of a user input object (e.g., a finger or a stylus). Touch sensor 122 is capable of detecting raw touch sensor data indicative of measured touch sensor readings across a grid of points generated in response to the location of one or more user input objects relative to the touch sensor 122. In some implementations, touch sensor 122 is associated with a capacitive touch-sensitive component such that raw touch sensor data corresponds to voltage levels registered by capacitance change across the surface of the capacitive touch-sensitive component. In some implementations, touch sensor 122 is associated with a resistive touch-sensitive component such that raw touch sensor data corresponds to voltage levels registered by resistance change across the surface of the resistive touch-sensitive component. Example user input objects for interfacing with touch sensor 122 can include one or more fingers, thumbs or hands of a user, a stylus operated by the user, or other user input objects. In particular, in one example, the user can employ a user input object to touch a touch-sensitive component associated with touch sensor 122 of user computing device 102. Touch and/or motion of the user input object relative to the touch-sensitive component can enable the user to provide input to the user computing device 102.

The user computing device 102 can also include one or more additional user input components 124 that receive user input. For example, the user input component 124 can track the motion of a user input object through computer vision systems that analyze imagery collected by a camera of the device 102 or through the use of radar (e.g., miniature radar) to detect touchless gesture-based user input. Thus, motion of a user input object relative to the user input component 124 enables the user to provide user input to the computing device 102.

The user computing device can also include one or more user output components 126. User output component 126 can include, for example, a display device. Such display device can correspond, in some implementations, to the touch-sensitive display device associated with touch sensor 122. User output component 126 can be configured to display user interfaces to a user as part of normal device operation of user computing device 102. In some implementations, user output component 126 can be configured to provide interfaces to a user that are used as part of a process of capturing a training dataset for use in training a machine-learned touch interpretation prediction model.

The user computing device 102 can store or include one or more machine-learned touch interpretation prediction models 120. In some implementations, the one or more touch interpretation prediction models 124 can be received from the machine learning computing system 130 over network 180, stored in the user computing device memory 114, and then used or otherwise implemented by the one or more processors 112. In some implementations, the user computing device 102 can implement multiple parallel instances of a single touch interpretation prediction model 120 (e.g., to perform parallel touch interpretation prediction for multiple input objects).

The machine learning computing system 130 can include one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the machine learning computing system 130 to perform operations.

In some implementations, the machine learning computing system 130 includes or is otherwise implemented by one or more server computing devices. In instances in which the machine learning computing system 130 includes plural server computing devices, such server computing devices can operate according to sequential computing architectures, parallel computing architectures, or some combination thereof.

The machine learning computing system 130 can store or otherwise include one or more machine-learned touch interpretation prediction models 140. For example, the touch interpretation prediction models 140 can be or can otherwise include various machine-learned models such as neural networks (e.g., deep recurrent neural networks) or other multi-layer non-linear models, regression-based models or the like. Example touch interpretation prediction models 140 are discussed with reference to FIGS. 4-5.

The machine learning computing system 130 can train the touch interpretation prediction models 140 via interaction with the training computing system 150 that is communicatively coupled over the network 180. The training computing system 150 can be separate from the machine learning computing system 130 or can be a portion of the machine learning computing system 130.

The training computing system 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the machine learning computing system 130 using various training or learning techniques, such as, for example, backwards propagation. The model trainer 160 can perform a number of generalization techniques (e.g., weight decays, dropouts, etc.) to improve the generalization capability of the models being trained.

In particular, the model trainer 160 can train a touch interpretation prediction model 140 based on a set of training data 142. The training data 142 can include ground-truth data (e.g., a first dataset that includes recorded touch sensor data and labels of determined touch interpretations applied to co-recorded screen content and/or a second dataset that includes an initial sequence of touch sensor data observations and a subsequent sequence of touch sensor data observations). In some implementations, if the user has provided consent, the training data 142 can be provided by the user computing device 102 (e.g., based on touch sensor data detected by the user computing device 102). Thus, in such implementations, the model 120 provided to the user computing device 102 can be trained by the training computing system 150 on user-specific data received from the user computing device 102. In some instances, this process can be referred to as personalizing the model.

The model trainer 160 can include computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the user computing device 102 can include the model trainer 160 and the training dataset 162. In such implementations, the touch interpretation prediction models can be both trained and used locally at the user computing device.

Figure 2:
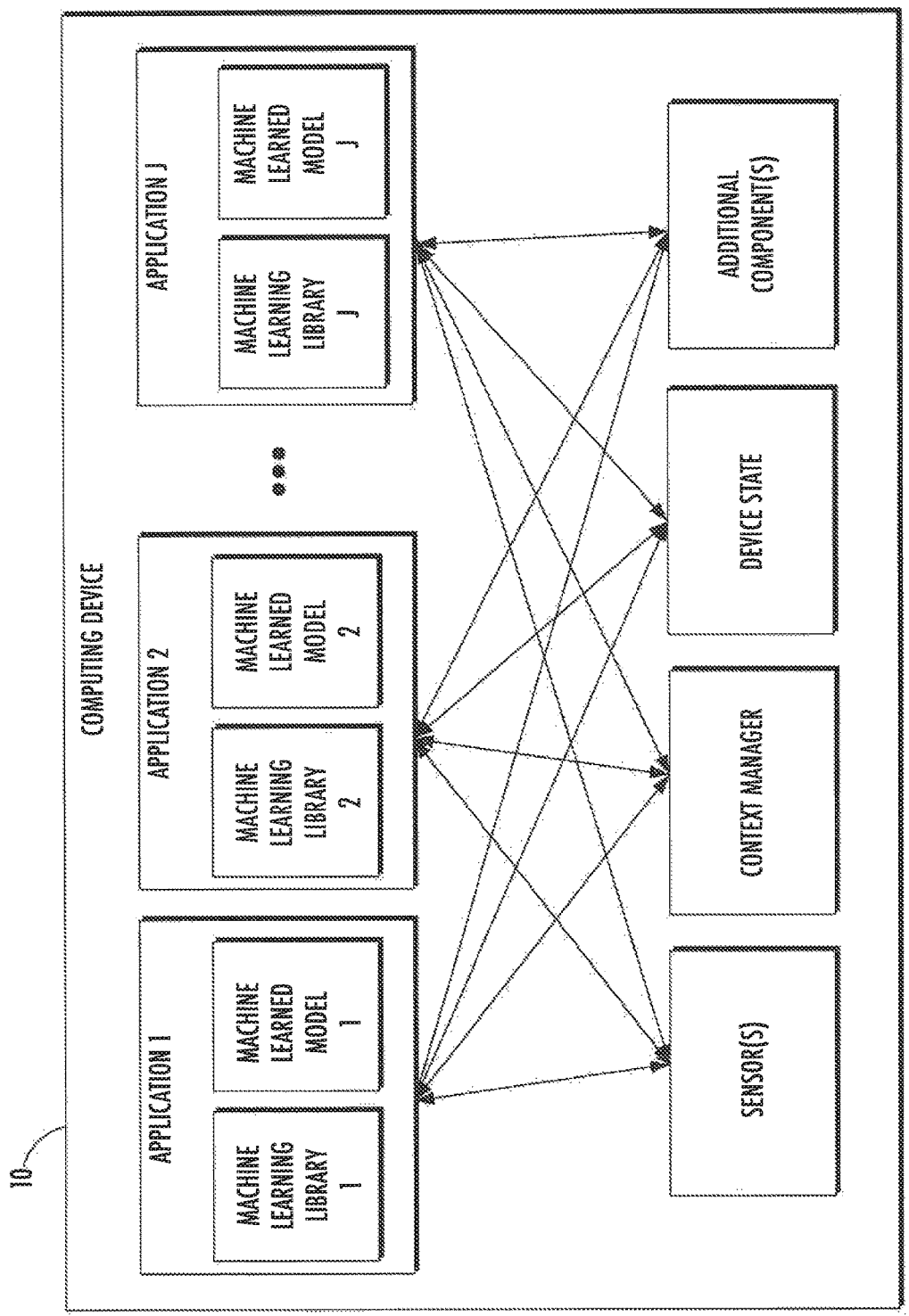
FIG. 2 depicts a block diagram of a first example computing device that performs machine learning according to example embodiments of the present disclosure.

FIG. 2 depicts a block diagram of an example computing device 10 that performs communication assistance according to example embodiments of the present disclosure. The computing device 10 can be a user computing device or a server computing device.

The computing device 10 includes a number of applications (e.g., applications 1 through J). Each application contains its own machine learning library and machine-learned model(s). For example, each application can include a machine-learned communication assistance model. Example applications include a text messaging application, an email application, a dictation application, a virtual keyboard application, a browser application, a virtual reality (VR) application, etc.

As illustrated in FIG. 2, each application can communicate with a number of other components of the computing device, such as, for example, one or more sensors, a context manager, a device state component, and/or additional components. In some implementations, each application can communicate with each device component using an API (e.g., a public API). In some implementations, the API used by each application can be specific to that application.

Figure 3:
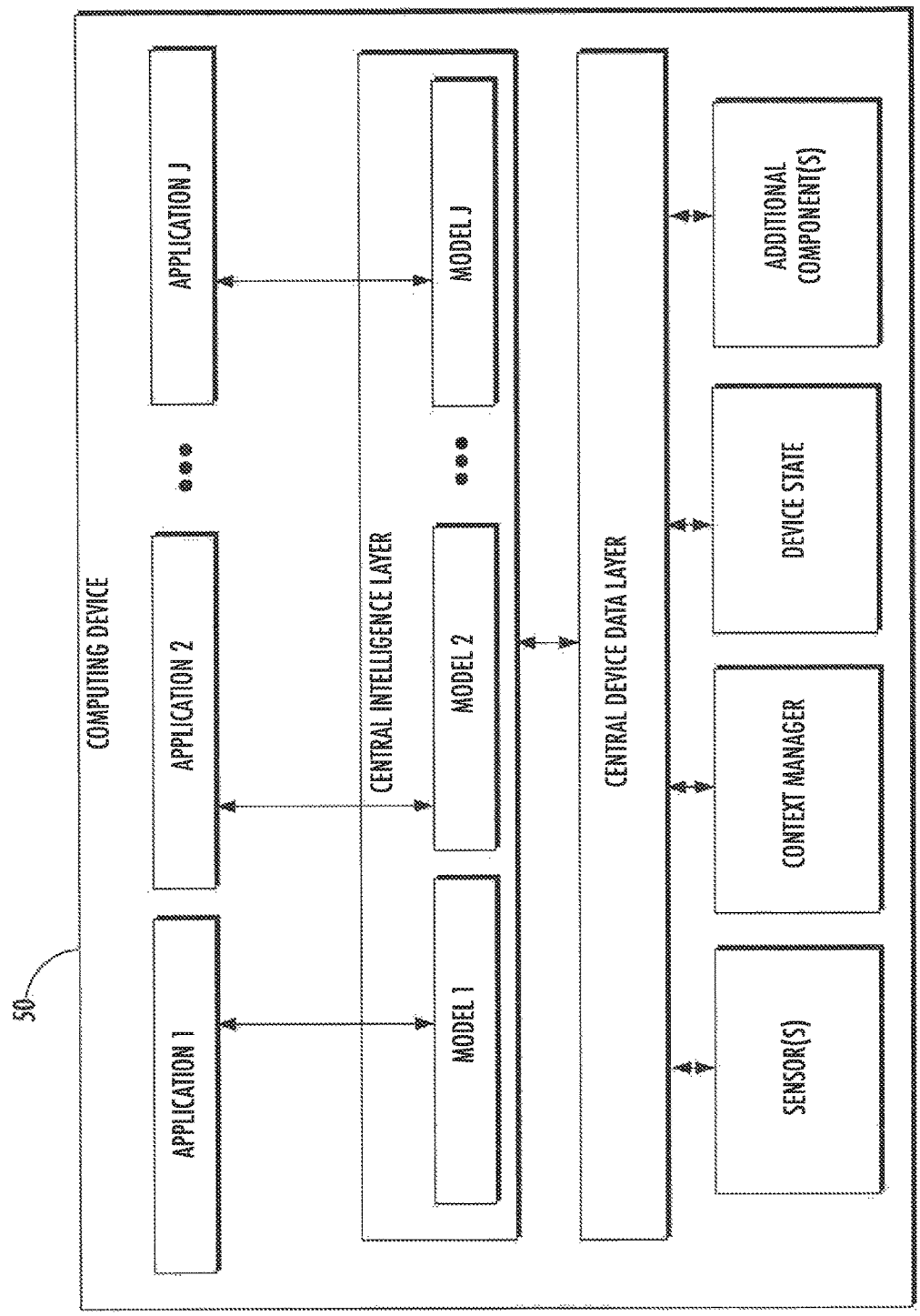
FIG. 3 depicts a block diagram of a second example computing device that performs machine learning according to example embodiments of the present disclosure.

FIG. 3 depicts a block diagram of an example computing device 50 that performs communication assistance according to example embodiments of the present disclosure. The computing device 50 can be a user computing device or a server computing device.

The computing device 50 includes a number of applications (e.g., applications 1 through J). Each application can be in communication with a central intelligence layer. Example applications include a text messaging application, an email application, a dictation application, a virtual keyboard application, a browser application, a virtual reality (VR) application, etc. In some implementations, each application can communicate with the central intelligence layer (and model(s) stored therein) using an API (e.g., a common API across all applications).

The central intelligence layer includes a number of machine-learned models. For example, as illustrated in FIG. 3, a respective machine-learned model (e.g., a communication assistance model) can be provided for each application and managed by the central intelligence layer. In other implementations, two or more applications can share a single machine-learned model. For example, in some implementations, the central intelligence layer can provide a single model (e.g., a single communication assistance model) for all of the applications. In some implementations, the central intelligence layer can be included within or otherwise implemented by an operating system of the computing device 50.

The central intelligence layer can communicate with a central device data layer. The central device data layer can be a centralized repository of data for the computing device 50. As illustrated in FIG. 3, the central device data layer can communicate with a number of other components of the computing device, such as, for example, one or more sensors, a context manager, a device state component, and/or additional components. In some implementations, the central device data layer can communicate with each device component using an API (e.g., a private API).

Example Touch Interpretation Prediction Models

Figure 4:
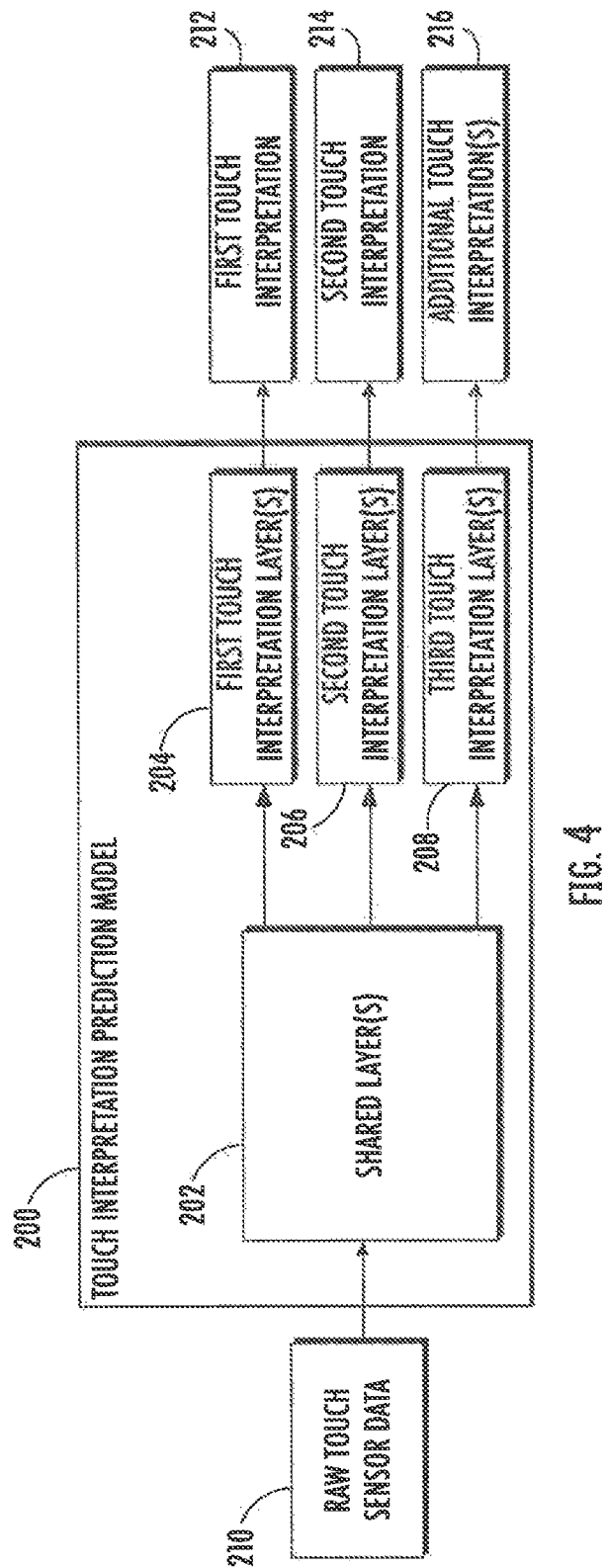
FIG. 4 depicts a first example model arrangement according to example embodiments of the present disclosure.

FIG. 4 depicts a first example touch interpretation prediction model 200 according to example embodiments of the present disclosure. The touch interpretation prediction model 200 can be a machine-learned model. In some implementations, touch interpretation prediction model 200 can be or can otherwise include various machine-learned models such as neural networks (e.g., deep recurrent neural networks) or other multi-layer non-linear models, regression-based models or the like. When touch interpretation prediction model 200 includes a recurrent neural network, this can be a multi-layer long short-term memory (LSTM) neural network, a multi-layer gated recurrent unit (GRU) neural network, or other form of recurrent neural network.

The touch interpretation prediction model 200 can be configured to receive raw touch sensor data 210. In one example, a user computing device (e.g., a mobile computing device) obtains raw touch sensor data 210 including one or more entries of user input object location and time. For example, the set of raw touch sensor data 210 can include one or more entries that provide the location of one or more user input objects in both the x and y dimensions and also a timestamp associated with each location. As another example, raw touch sensor data 210 can include one or more entries that describe a change in the location of one or more user input objects in both the x and y dimensions and also a timestamp or change in time associated with each pair of changes in x and y values. In some implementations, the set of raw touch sensor data 210 can be iteratively updated, refreshed, or generated as additional touch sensor data is detected.

Referring still to FIG. 4, the raw touch sensor data 210 can be provided as input into the machine-learned touch interpretation prediction model 200. In some implementations, the touch interpretation prediction model 200 can include one or more shared layers 202 and multiple different and distinct output layers 204-208. The multiple output layers 204-208 can be positioned structurally after the one or more shared layers 202 within the touch interpretation prediction model 200. The one or more shared layers 202 can include an input layer and one or more additional shared layers positioned structurally after the input layer. The input layer is configured to receive the raw touch sensor data 210. The multiple output layers 204-208 can be configured to respectively provide multiple predicted touch interpretations as outputs of the touch interpretation prediction model 200. For instance, a first output layer 204 can be a first touch interpretation output layer configured to provide a first predicted touch interpretation 212 as an output of touch interpretation prediction model 200. A second output layer 206 can be a second touch interpretation output layer configured to provide a second predicted touch interpretation 214 as an output of touch interpretation prediction model 200. A third output layer 208 can be a third touch interpretation output layer configured to provide one or more additional predicted touch interpretations 216 as an output of touch interpretation prediction model 100. Although three output layers 204-208 and three model outputs 212-216 are illustrated in FIG. 4, any number of two or more output layers and model outputs can be used in accordance with the disclosed multi-tasked machine learned models.

In some implementations, the machine-learned touch interpretation prediction model 200 can include a neural network and inputting the raw touch sensor data 210 includes inputting the raw touch sensor data into the neural network of the machine-learned touch interpretation prediction model 200. In some implementations, the touch interpretation prediction model 200 can include a convolutional neural network. In some implementations, the touch interpretation prediction model 200 can be a temporal model that allows the raw touch sensor data to be referenced in time. In such instances, a neural network within the touch interpretation prediction model 200 can be a recurrent neural network (e.g., a deep recurrent neural network). In some examples, a neural network within the touch interpretation prediction model 200 can be a long short-term memory (LSTM) neural network, a gated recurrent unit (GRU) neural network, or other form of recurrent neural network.

In some implementations, machine-learned touch interpretation prediction model 200 can include many different sizes, numbers of layers and levels of connectedness. Some layers can correspond to stacked convolutional layers (optionally followed by contrast normalization and max-pooling) followed by one or more fully-connected layers. For neural networks trained by large datasets, the number of layers and layer size can be increased by using dropout to address the potential problem of overfitting. In some instances, a neural network can be designed to forego the use of fully connected upper layers at the top of the network. By forcing the network to go through dimensionality reduction in middle layers, a neural network model can be designed that is quite deep, while dramatically reducing the number of learned parameters. Additional specific features of example neural networks that can be used in accordance with the disclosed technology can be found in "Scalable Object Detection using Deep Neural Networks," Dumitru Erhan et al., arXiv:1312.2249 [cs.CV], CVPR 2014 and/or "Scalable High Quality Object Detection," Christian Szegedy et al., arXiv:1412.1441[cs.CV], December. 2015, which are incorporated by reference herein for all purposes.

In some implementations, touch interpretation prediction model 200 can be configured to generate multiple predicted touch interpretations. In some examples, the touch interpretation prediction model 200 can also output a learned confidence measure for each of the predicted touch interpretations. For example, a confidence measure for each predicted touch interpretation could be represented as a confidence measure value within a range (e.g., 0.0-1.0 or 0-100%) indicating a degree of likely accuracy with which a predicted touch interpretation is determined.

In some implementations, touch interpretation prediction model 200 can be configured to generate at least a first predicted touch interpretation 212 and a second predicted touch interpretation 214. The first predicted touch interpretation 212 can include a first one of a set of touch point interpretations, a gesture interpretation determined from a predefined gesture class, a touch prediction vector for one or more future times, and an accessibility mode. The second predicted touch interpretation 214 can include a second one of a set of touch point interpretations, a gesture interpretation determined from a predefined gesture class, a touch prediction vector for one or more future times, and an accessibility mode. The first touch point interpretation 212 can be different than the second touch point interpretation 214. One or more additional predicted touch interpretations 216 can also be generated by touch interpretation prediction model. Additional predicted touch interpretations 216 can be selected from the same group described above or can include specialized touch interpretations as described herein. More particular aspects of the above example touch interpretations are described with reference to FIG. 5.

Figure 5:
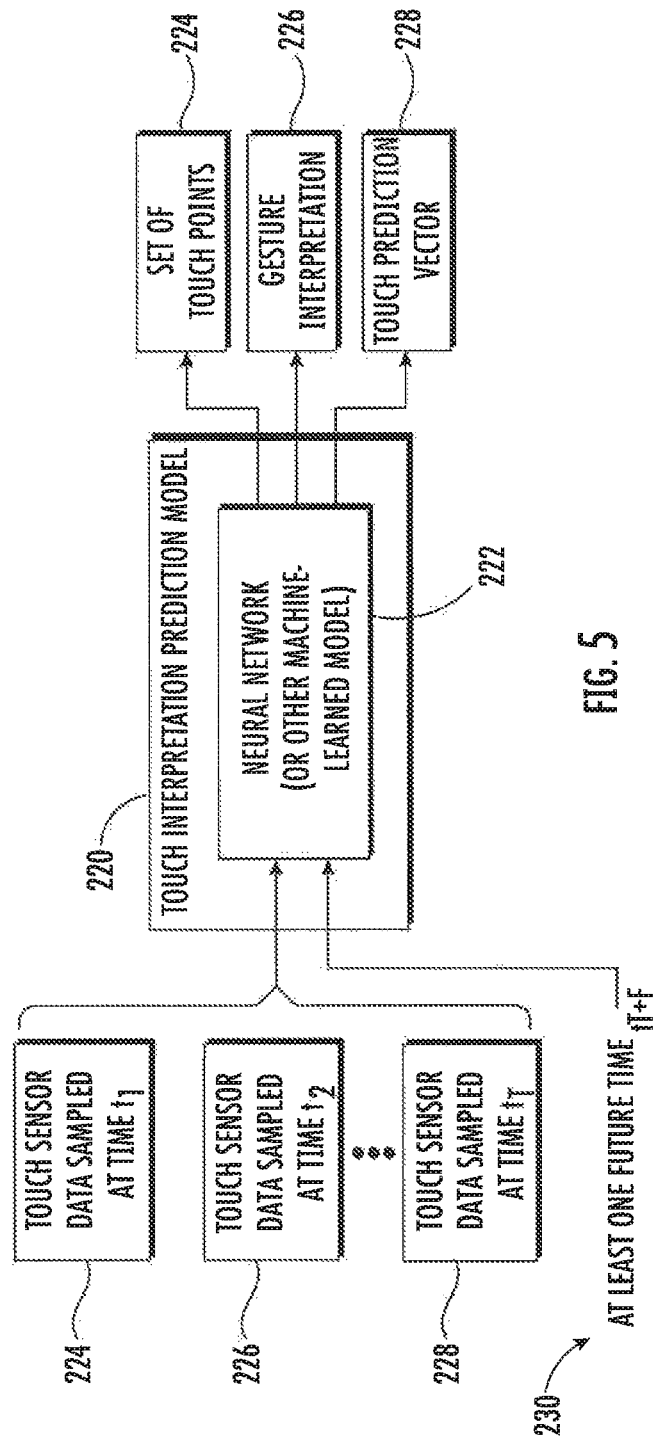
FIG. 5 depicts a second example model arrangement according to example embodiments of the present disclosure.

FIG. 5 depicts a second example touch interpretation prediction model 220 according to example embodiments of the present disclosure. Touch interpretation prediction model 220 can be similar to touch interpretation prediction model 200 of FIG. 4, and features described with reference to one can apply to the other and vice versa. In some implementations, the sensor output prediction model 220 can be a temporal model that allows the sensor data to be referenced in time. In such implementations, the raw touch sensor data provided as input to the touch interpretation prediction model 220 can be provided as a time-stepped sequence of T inputs. For instance, the raw touch sensor data can be obtained and provided as a sequence of T inputs 224-228, each input corresponding to raw touch sensor data sampled or obtained at a different time step. For instance, a time-stepped sequence of touch sensor data 224-228 can be obtained iteratively in real time or near real time from a touch sensor at T different sample times (e.g., $t_1, t_2, \ldots, t_T$). In some examples, the time difference between the T different sample times (e.g., $t_1, t_2, \ldots, t_T$) can be the same or it can be different. In such example, raw touch sensor data can be obtained for each of the T different times. For instance, a first set of touch sensor data 224 can correspond to touch sensor data sampled at time $t_1$. A second set of touch sensor data 226 can correspond to touch sensor data sampled at time $t_2$. An additional number of sets of touch sensor data can be provided in a sequence of T time-stepped samples until a last set of touch sensor data 228 is provided that corresponds to touch sensor data sampled at time $t_T$. Each of the sets of touch sensor data 224-228 can be iteratively provided as input to the touch interpretation prediction model 200/220 as it is iteratively obtained.

In some implementations, the one or more sets of touch sensor data 224-228 depicted in FIG. 5 can be represented as a time series $Z_1, Z_2, \ldots, Z_T$ of sensor readings. Each sensor reading corresponding to touch sensor data sets 224-228 can be an array of points having a generally rectangular shape characterized by a first dimension (e.g., x) and a second dimension (e.g., y). For example, each sensor reading at time t can be represented as $Z_t = z_{xyt}$ for $x \in 1 \ldots W$, $y \in 1 \ldots H$, $t \in 1 \ldots T$, where $z_{xyt}$ is the raw sensor measurement of the touch sensor at position (x,y) at time t for a sensor size of W×H points.

In some implementations, a computing device can feed the sets of raw touch sensor data 224-228 as input to the machine-learned touch interpretation prediction model in an online manner. For example, during use in an application, the latest set of touch sensor data (e.g., values for changes in x, y, and time) can be fed into the touch interpretation prediction model 220 upon each instance in which an update is received from the relevant touch sensor(s) (e.g., touch-sensitive display screen). Thus, raw touch sensor data collection and touch interpretation prediction can be performed iteratively as additional sets of touch sensor data 224-228 are collected.

In some examples, the touch interpretation prediction model 220 of FIG. 5 can be configured to generate multiple predicted touch interpretations, such as the multiple predicted touch interpretations 212-216 illustrated in and previously described with reference to FIG. 4.

In some implementations, the predicted touch interpretations generated as outputs of touch interpretation prediction model 220 can include a set of touch point interpretations 224 that respectively describe zero (0), one (1), or more intended touch points. Unintended touch points can also be identified directly or can be inferred by their exclusion from the list of intended touch points. For instance, a set of touch point interpretations 224 that describe intended touch points can be output as a potentially empty set of intended touch points, each touch point represented as a two-dimensional coordinate pair (x, y) for up to N different touch points (e.g., $(x, y)_1 \ldots (x, y)_N$). In some implementations, additional data could accompany each identified touch point in the set of touch point interpretations 224. For instance, in addition to a location of each intended touch point, the set of touch point interpretations 224 can also include an estimated pressure of the touch at each touch point and/or a touch type describing a predicted type of user input object associated with each touch point (e.g., which finger, knuckle, palm, stylus, etc. was predicted to cause the touch), and/or a user input object radius on the touch-sensitive display screen, and/or other user input object parameters.

In some implementations, the set of touch point interpretations 224 is intended to include intended touch points and exclude unintended touch points. Unintended touch points can include, for example, accidental and/or undesired touch locations on a touch-sensitive display screen or component. Unintended touch points can arise from a number of circumstances, for example, touch sensor noise at one or more points, a manner of holding a mobile computing device that results in inadvertent touching on certain portions of the touch sensor surface, pocket dialing or inadvertent picture taking, and the like. For instance, unintended touch points can arise when a user holds a mobile device (e.g., a smartphone) with a first hand while providing user input to a touch-sensitive display screen with a second hand. Portions of the first hand (e.g., a palm and/or thumb of a user) can sometimes provide input to the touch-sensitive display screen around the edges of the display screen corresponding to unintended touch points. This situation can be especially prevalent for mobile computing devices having relatively smaller bezels around the outer periphery of such devices.

In some implementations, the predicted touch interpretations generated as outputs of touch interpretation prediction model 220 can include a gesture interpretation 226 that characterizes at least a portion of the raw touch sensor data 210 and/or 224-228 (and additionally or alternatively the previously predicted set of touch point interpretations 224 and/or a touch prediction vector 228, etc.) as a gesture determined from a predefined gesture class. In some implementations, a gesture interpretation 226 can be based at least in part on the last α steps of raw touch sensor data 210 and/or 224-228. Example gestures can include, but are not limited to no recognized gesture, a click/press gesture (e.g., including a hard click/press, a soft click/press, a short click/press, and/or a long click/press), a tap gesture, a double tab gesture for selecting or otherwise interacting with one or more items displayed on a user interface, a scroll gesture or swipe gesture for translating a user interface in one or more directions and/or transitioning a user interface screen from one mode to another, a pinch gesture for zooming in or out relative to a user interface, a drawing gesture for drawing a line or typing a word, and/or others. In some implementations, a predefined gesture class from which gesture interpretations 226 are determined can be or otherwise include a set of gestures associated with a specialized accessibility mode (e.g., a visually impaired interface mode by which a user interacts using Braille or other specialized writing style characters).

In some implementations, if at least a portion of the raw touch sensor data 210 and/or 224-228 is characterized as an interpreted gesture, the gesture interpretation 226 can include information identifying not only the type of gesture, but additionally or alternatively the location of the gesture. For instance, a gesture interpretation 226 may take the form of a three-dimensional dataset (e.g., (c, x, y)), where c is the predefined gesture class (e.g., "not a gesture", "tap", "swipe", "pinch to zoom", "double tap swipe for zoom", etc.) and x, y are the coordinates in a first (e.g., x) dimension and a second (e.g., y) dimension where the gesture happened on a touch-sensitive display.

In some implementations, the predicted touch interpretations generated as outputs of touch interpretation prediction model 220 can include an accessibility mode describing a predicted type of interaction of the one or more user input objects determined from a predefined class of accessibility modes including one or more of a standard interface mode and a visually impaired interface mode.

In some examples, the predicted touch interpretations generated as outputs of touch interpretation prediction model 220 can include a touch prediction vector 228 that describes one or more predicted future locations of the one or more user input objects respectively for one or more future times. In some implementations, each future location of the one or more user input objects can be presented as a sensor reading $Z_{t+\theta}$ depicting the expected pattern on the touch sensor θ time steps in the future. In some examples, the machine-learned touch interpretation prediction model 220 can be configured to generate the touch prediction vector 228 as an output. In some examples, the machine-learned touch interpretation prediction model 220 can additionally or alternatively be configured to receive the determined touch prediction vector 228 as an input to help with related determinations by the machine-learned touch interpretation prediction model 220 of other touch interpretations (e.g., the gesture interpretation 226, set of touch point interpretations 224, etc.)

The time steps θ for which a touch prediction vector 228 is determined can be configured in a variety of manners. In some implementations, the machine-learned touch interpretation prediction model 220 can be configured to consistently output the predicted future locations for a predefined set of values θ defining one or more future times. In some implementations, the one or more future times θ can be provided as a separate input to the machine-learned touch interpretation prediction model 220 alongside the raw touch sensor data 224-228. For instance, a computing device can input a time vector 230 into the machine-learned touch interpretation prediction model 220 alongside the raw touch sensor data 224-228. The time vector 230 can provide a list of one or more time lengths that are desired to be predicted by the touch interpretation prediction model (e.g., 10 ms, 20 ms, etc.). Thus, the time vector 230 can describe one or more future times at which the location of the user input object is to be predicted. In response to receipt of the raw touch sensor data 224-228 and the time vector 230, the machine-learned touch interpretation prediction model 220 can output a touch prediction vector 228 that describes a predicted future location of the user input object for each time or time length described by the time vector 230. For example, the touch prediction vector 228 can include a pair of values for location in the x and they dimensions for each future time or a pair of values for change in the x and they dimensions for each future time identified in time vector 230.

Figure 6:
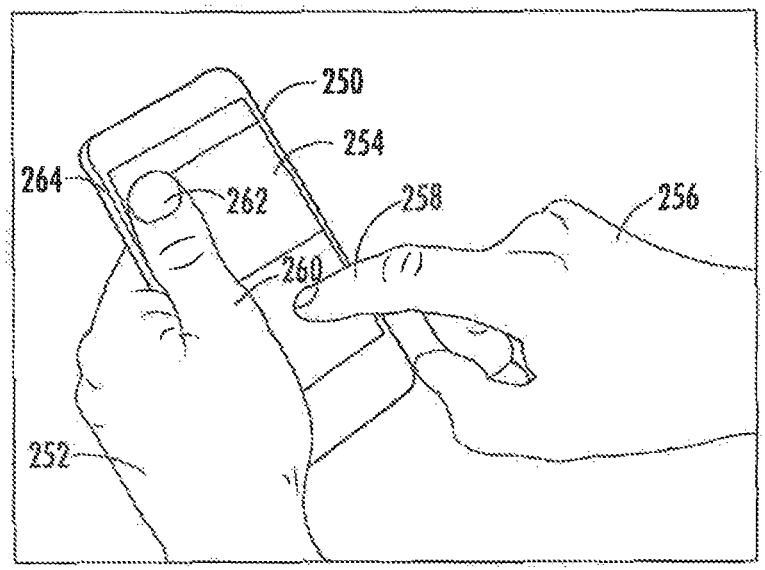
FIG. 6 depicts a first aspect of an example use case according to example embodiments of the present disclosure.
Figure 7:
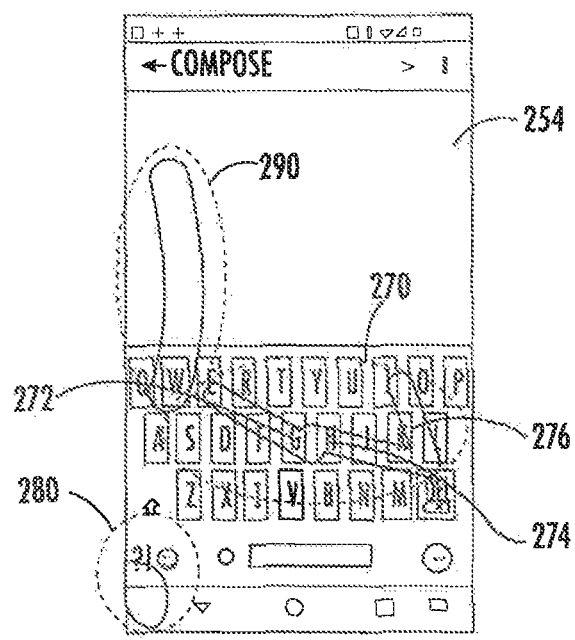
FIG. 7 depicts a second aspect of an example use case according to example embodiments of the present disclosure.

FIGS. 6 and 7 respectively depict first and second aspects of an example use case according to example embodiments of the present disclosure. In particular, such aspects are helpful in providing context for certain predicted touch interpretations from raw touch sensor data. FIG. 6 depicts a user holding a mobile device 250 (e.g., a smartphone) with a first hand 252 while providing user input to a touch-sensitive display screen 254 with a second hand 256. Desired input to the touch-sensitive display screen 254 of mobile device 250 can be provided by finger 258 of second hand 256. Portions of the first hand 252, namely the palm 260 and/or thumb 262 of the user) can sometimes provide undesired input to the touch-sensitive display screen 254 of mobile device 250. Such undesired touch input can be especially prevalent when mobile device 250 has a very small bezel 264 around the outer periphery. User interaction with touch-sensitive display screen 254 thus includes touch resulting from three different user input objects (e.g., finger 258, palm 260, and thumb 262).

FIG. 7 depicts co-recorded screen content and associated overlaid raw touch sensor data associated with a keyboard application in which a user provided input as illustrated in FIG. 6. FIG. 7 depicts a potential touch sensor reading over a time period when a user input corresponds to typing the word "hello" in an on-screen keyboard provided on the touch-sensitive display screen 254. Desired input corresponds to touch sensor data detected at first portion 270, while undesired input corresponds to touch sensor data detected at second portion 280 and third portion 290. Desired input detected at first portion 270 can include touch sensor data representing a first touch sequence 272 corresponding to finger 258 moving from an "H" button to an "E" button in the on-screen keyboard, a second touch sequence 274 corresponding to finger 258 moving from the "E" button to an "L" button, and a third touch sequence 276 corresponding to finger 258 moving from the "L" button to an "O" button. Undesired input detected at second portion 280 corresponds to an area in the lower left corner of touch-sensitive display screen 254 where the user's palm 260 was resting. Undesired input detected at third portion 290 corresponds to an area where the user's thumb 262 was resting.

Based on the types of raw touch sensor data received during the user interaction depicted in FIGS. 6 and 7, a machine-learned touch interpretation prediction models as disclosed herein can be trained to predict a set of touch points that includes the intended touch points associated with the first portion 270 of raw touch sensor data and that excludes the unintended touch points associated with the second portion 280 and third portion 290 of raw touch sensor data. The machine-learned touch interpretation prediction models as disclosed herein can also be trained to simultaneously predict a gesture interpretation of the first portion 270 of raw touch sensor data as typing the word "hello." In some examples, a machine-learned touch interpretation prediction model as disclosed herein can also be trained to simultaneously generate a touch prediction vector predicting subsequent touch locations. For example, if sensor readings were currently available for only the first touch sequence 272 and second touch sequence 274 depicted in FIG. 7, the touch interpretation prediction model could generate a touch prediction vector predicting the third touch sequence 276. The simultaneous predictions of the set of touch points, the gesture interpretation and predicted touch vector can all be generated based on the same set of raw touch sensor data provided as an input to a touch interpretation prediction model.

Example Methods

Figure 8:
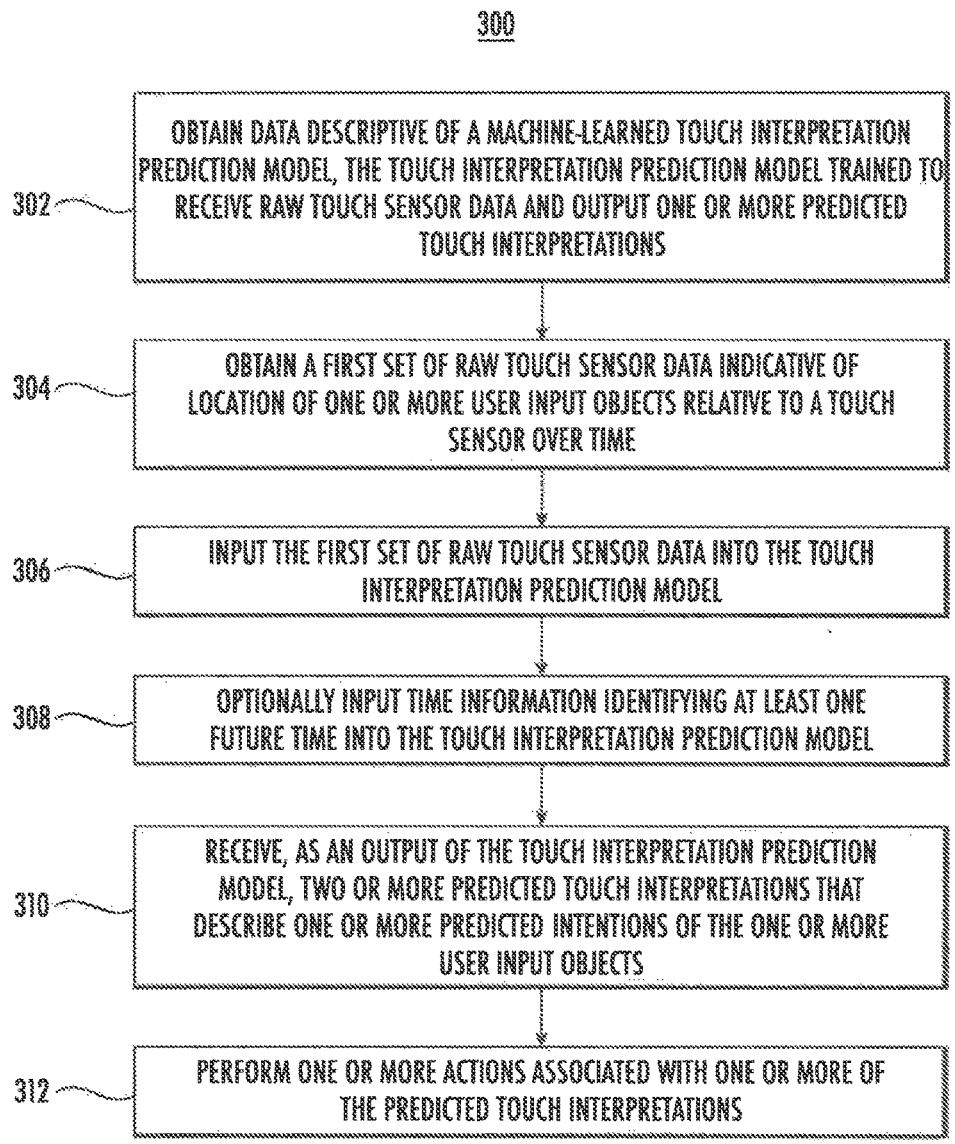
FIG. 8 depicts a flow chart diagram of an example method to perform machine learning according to example embodiments of the present disclosure.

FIG. 8 depicts a flow chart diagram of an example method 300 to perform machine learning according to example embodiments of the present disclosure.

At 302, one or more computing devices can obtain data descriptive of a machine-learned touch interpretation prediction model. The touch interpretation prediction model can have been trained to receive raw touch sensor data and generate one or more predicted touch interpretations as outputs. The touch interpretation prediction model can be or can otherwise include various machine-learned models such as neural networks (e.g., deep recurrent neural networks) or other multi-layer non-linear models, regression-based models or the like. The touch interpretation model can include at least one shared layer and multiple different and distinct output layers positioned structurally after the at least one shared layer. The touch interpretation prediction model for which data is obtained at 302 can include any of the features described relative to touch interpretation prediction models 200 and 220 of FIGS. 4-5 or variations thereof.

At 304, one or more computing devices can obtain a first set of raw touch sensor data. The raw touch sensor data can be indicative of one or more locations of one or more user input objects relative to a touch sensor over time. At 306, one or more computing devices can input the raw touch sensor data obtained at 304 into a machine-learning system of the touch interpretation prediction model. In some implementations, such as when the touch interpretation prediction model is configured to generate at least one touch prediction vector, one or more computing devices can optionally input at 308 time information identifying at least one future time into the touch interpretation prediction model. In some implementations, the time information provided as input at 308 can be in the form of a time vector descriptive of one or more future times. The one or more future times can be defined as time lengths relative to the current time and/or the time at which the touch sensor was sampled to obtain the touch sensor data at 304.

At 310, one or more computing devices can receive, as an output of the touch interpretation prediction model, two or more predicted touch interpretations. The two or more predicted touch interpretations can describe one or more predicted intentions of the one or more user input objects. In some implementations, the two or more predicted touch interpretations include a first predicted touch interpretation and a second different touch interpretation. In some examples, the two or more predicted touch interpretations received at 310 can include a set of touch point interpretations that respectively describe zero, one or more touch points. The set of touch point interpretations can also include a touch type describing a predicted type of user input object associated with each touch point and/or an estimated pressure of the touch at each touch point. In some examples, the two or more predicted touch interpretations received at 310 can include a gesture interpretation that characterizes at least a portion of the first set of raw touch sensor data as a gesture determined from a predefined gesture class. In some examples, the two or more predicted touch interpretations received at 310 can include a touch prediction vector that describes one or more predicted future locations of the one or more user input objects respectively for one or more future times. At 312, one or more computing devices can perform one or more actions associated with one or more of the predicted touch interpretations. In one example, touch sensor data is used as input for a virtual reality application. In such instance, performing one or more actions at 312 can include providing an output of the touch interpretation prediction model to the virtual reality application. In another example, touch sensor data is used as input for a mobile computing device (e.g., a smartphone). In such instance, performing one or more actions at 312 can include providing an output of the touch interpretation prediction model to an application running on the mobile computing device (e.g., a text messaging application, an email application, a dictation application, a virtual keyboard application, a browser application, etc.). In still further examples, performing one or more actions at 312 can include providing one or more predicted touch interpretations to an application via an application programming interface (API).

Figure 9:
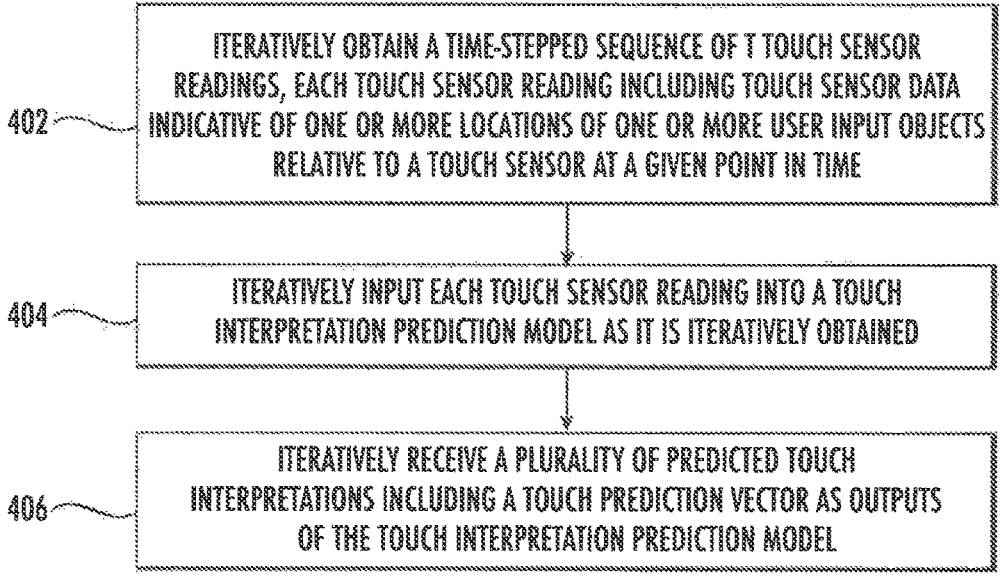
FIG. 9 depicts a flow chart diagram of a first additional aspect of an example method to perform machine learning according to example embodiments of the present disclosure.

FIG. 9 depicts a flow chart diagram of a first additional aspect of an example method 400 to perform machine learning according to example embodiments of the present disclosure. More particularly, FIG. 9 describes a temporal aspect of providing inputs to a touch interpretation prediction model and receiving outputs therefrom according to example embodiments of the present disclosure. At 402, one or more computing devices can iteratively obtain a time-stepped sequence of T touch sensor data readings such that each of the T touch sensor readings includes touch sensor data indicative of one or more locations of one or more user input objects relative to a touch sensor at a given point in time. Each touch sensor reading obtained at 402 can be iteratively input by the one or more computing devices at 404 into the touch interpretation prediction model as it is iteratively obtained. At 406, one or more computing devices can iteratively receive a plurality of predicted touch interpretations as outputs of the touch interpretation prediction model.

Figure 10:
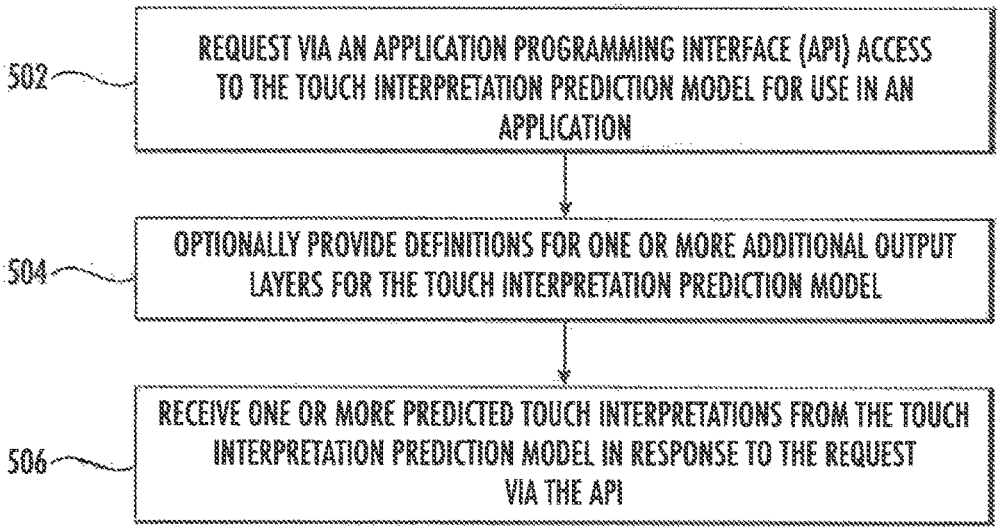
FIG. 10 depicts a flow chart diagram of a second additional aspect of an example method to perform machine learning according to example embodiments of the present disclosure.

FIG. 10 depicts a flow chart diagram of a second additional aspect of an example method 500 to perform machine learning according to example embodiments of the present disclosure. More particularly, FIG. 10 describes using an API to provide outputs of a touch interpretation prediction model to one or more software applications. At 502, a first application (e.g., a software application running on a computing device) can request access to the machine-learned touch interpretation prediction model via an application programming interface (API) such that the touch interpretation prediction model or a portion thereof can be used in the first application. The machine-learned touch interpretation prediction model can be hosted as part of a second application or in a dedicated layer, application, or component within the same computing device as the first application or in a separate computing device.

In some implementations, the first application can optionally provide definitions at 504 for one or more additional output layers for the touch interpretation prediction model. Provision of such definitions can effectively add custom output layers to the machine-learned touch interpretation prediction model that can be further trained on top of a pre-trained, stable model. In some examples, an API can allow definition libraries to be provided at 504 from a machine learning tool such as TensorFlow and/or Theano. Such tools can help to specify additional training data paths for a specialized output layer of the touch interpretation prediction model. At 506, the one or more computing devices can receive one or more predicted touch interpretations from the touch interpretation prediction model in response to the request via the API.

Figure 11:
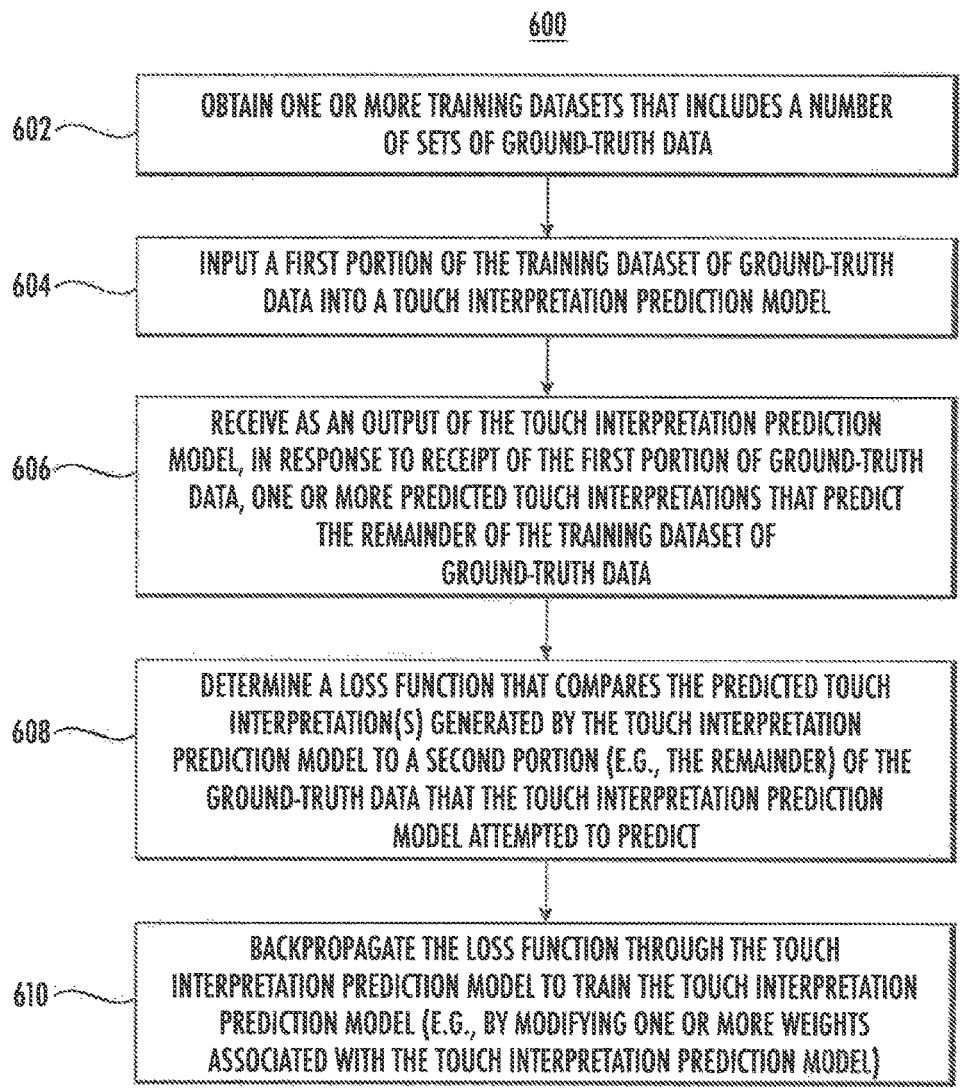
FIG. 11 depicts a flow chart diagram of a training method for a machine-learned model according to example embodiments of the present disclosure.

FIG. 11 depicts a flow chart diagram of a first example training method 600 for a machine-learned touch interpretation prediction model according to example embodiments of the present disclosure. More particularly, at 602, one or more computing devices (e.g., within a training computing system) can obtain one or more training datasets that respectively include a number of sets of ground-truth data.

For example, the one or more training datasets obtained at 602 can include a first example training dataset including touch sensor data and corresponding labels that describe a large number of previously-observed touch interpretations. In one implementation, the first example training dataset includes a first portion of data corresponding to recorded touch sensor data indicative of one or more user input object locations relative to a touch sensor. The recorded touch sensor data can, for example, be recorded while a user is operating a computing device having a touch sensor under normal operating conditions. The first example training dataset obtained at 602 can further include a second portion of data corresponding to labels of determined touch interpretations applied to recorded screen content. The recorded screen content can, for example, be co-recorded at the same time as the first portion of data corresponding to recorded touch sensor data. The labels of determined touch interpretations can include, for example, a set of touch point interpretations and/or gesture interpretations determined at least in part from the screen content. In some instances, the screen content can be labeled manually. In some instances, the screen content can be labeled automatically using conventional heuristics applied to interpret raw touch sensor data. In some instances, screen content can be labeled using a combination of automatic labeling and manual labeling. For instance, cases when a palm is touching a touch-sensitive display screen that prevents the user from using a device in the desired way could be best identified using manually labeling, while other touch types can be potentially identified using automatic labeling.

In other implementations, a first example training dataset obtained at 602 can be built using a dedicated data collection application that prompts a user to perform certain tasks relative to the touch-sensitive display screen (e.g., asking a user to "click here" while holding the device in a specific way). Raw touch sensor data can be correlated with touch interpretations identified during operation of the dedicated data collection application to form first and second portions of the first example training dataset.

In some implementations, when training the machine-learned touch interpretation prediction model to determine a touch prediction vector, the one or more training datasets obtained at 602 can include a second example training dataset can include a first portion of data corresponding to an initial sequence of touch sensor data observations (e.g., $Z_1 \ldots Z_T$) and a second portion of data corresponding to a subsequent sequence of touch sensor data observations (e.g., $Z_{t+1} \ldots Z_{T+F}$). A sequence of sensor data $Z_1 \ldots Z_T$ automatically lends itself to training the prediction of future sensor data $Z_{T+1} \ldots Z_{T+F}$ at one or more future times since predicted steps can be compared to observed steps upon occurrence of the future times. It should be appreciated that any combination of the above-described techniques and others can be used to obtain one or more training datasets at 602.

At 604, one or more computing devices can input a first portion of the training dataset of ground-truth data into a touch interpretation prediction model. At 606, one or more computing devices can receive, as an output of the touch interpretation prediction model, in response to receipt of the first portion of ground-truth data, one or more predicted touch interpretations that predicts the remainder of the training dataset (e.g., a second portion of the ground-truth data).

At 608, one or more computing systems within a training computing system or otherwise can apply or otherwise determine a loss function that compares the one or more predicted touch interpretations generated by the touch interpretation prediction model at 606 to a second portion (e.g., the remainder) of the ground-truth data that the touch interpretation prediction model attempted to predict. The one or more computing devices then can backpropagate the loss function at 610 through the touch interpretation prediction model to train the touch interpretation prediction model (e.g., by modifying at least one weight of the touch interpretation prediction model). For example, the computing device can perform truncated backwards propagation through time to backpropagate the loss function determined at 608 through the touch interpretation prediction model. A number of generalization techniques (e.g., weight decays, dropouts, etc.) can optionally be performed at 610 to improve the generalization capability of the models being trained. In some examples, the training procedure described in 602-610 can be repeated several times (e.g., until an objective loss function no longer improves) to train the model. After the model has been trained at 610, it can be provided to and stored at a user computing device for use in providing predicted touch interpretations at the user computing device. It should be appreciated that other training methods than backpropagation of a determined loss function can also be used to train a neural network or other machine-learned model for determining touch points and other touch interpretations.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 8 through 11 respectively depict steps performed in a particular order for purposes of illustration and discussion, the methods of the present disclosure are not limited to the particularly illustrated order or arrangement. The various steps of the methods 300, 400, 500, and 600 can be omitted, rearranged, combined, and/or adapted in various ways without deviating from the scope of the present disclosure.

What is claimed is:

1. A computing device that determines touch interpretation from user input objects, comprising:
   at least one processor;
   a machine-learned touch interpretation prediction model, wherein the touch interpretation prediction model has been trained to directly receive raw touch sensor data indicative of measured touch sensor readings across a grid of points generated in response to one or more locations of one or more user input objects relative to a touch sensor at one or more times and, in response to receipt of the raw touch sensor data, output simultaneous multiple predicted touch interpretations, each predicted touch interpretation corresponding to a different type of predicted touch interpretation based at least in part on the touch sensor data, wherein the simultaneous multiple predicted touch interpretations comprise at least first and second predicted touch interpretations determined from a group comprising a set of touch point interpretations that respectively describe one or more intended touch points, a gesture interpretation that characterizes the set of touch point interpretations as a gesture determined from a predefined gesture class, and a touch prediction vector that describes one or more predicted future locations of the one or more user input objects respectively for one or more future times; and
   at least one tangible, non-transitory computer-readable medium that stores instructions that, when executed by the at least one processor, cause the at least one processor to perform operations, the operations comprising:
      obtaining a first set of raw touch sensor data indicative of one or more user input object locations relative to a touch sensor over time;
      inputting the first set of raw touch sensor data into the machine-learned touch interpretation prediction model;
      receiving, as an output of the touch interpretation prediction model, simultaneous multiple predicted touch interpretations that describe predicted intentions of the one or more user input objects, each predicted touch interpretation describing a different predicted aspect of the one or more user input objects; and
      performing one or more actions associated with the multiple predicted touch interpretations.

2. The computing device of claim 1, wherein the one or more predicted touch interpretations comprise at least a first predicted touch interpretation comprising a set of touch point interpretations that respectively describe one or more intended touch points and a second predicted touch interpretation comprising a gesture interpretation that characterizes the set of touch point interpretations as a gesture determined from a predefined gesture class.

3. The computing device of claim 1, wherein the machine-learned touch interpretation prediction model comprises a deep recurrent neural network with a plurality of output layers, each output layer corresponding to a different type of touch interpretation describing one or more predicted intentions of the one or more user input objects.

4. The computing device of claim 1, wherein obtaining the first set of raw touch sensor data comprises obtaining the first set of raw touch sensor data associated with one or more fingers or hand portions of a user or a stylus operated by the user, the first set of raw touch sensor data descriptive of a location of the one or more fingers, hand portions or stylus relative to a touch-sensitive screen.

5. The computing device of claim 1, wherein obtaining the first set of raw touch sensor data comprises:
   obtaining the first set of raw time sensor data that provides at least one value describing a change in the location of the one or more user input objects in an x dimension, at least one value describing a change in the location of the one or more user input objects in a y dimension, and at least one value describing a change in time; or
   obtaining the first set of raw time sensor data that provides at least two values describing at least two locations of the one or more user input objects in the x dimension, at least two values describing at least two locations of the one or more user input objects in the y dimension, and at least two values describing at least two times.

6. The computing device of claim 1, wherein the machine-learned touch interpretation prediction model has been trained based on a first set of training data that includes a first portion of data corresponding to recorded touch sensor data indicative of one or more user input object locations relative to a touch sensor and a second portion of data corresponding to labels of determined touch interpretations applied to recorded screen content, wherein the first portion of data and the screen content are recorded at the same time.

7. The computing device of claim 1, wherein the machine-learned touch interpretation prediction model has been trained based on a second set of training data that includes a first portion of data corresponding to an initial sequence of touch sensor data observations and a second portion of data corresponding to a subsequent sequence of touch sensor data observations.

8. The computing device of claim 1, wherein the one or more predicted touch interpretations comprise a set of touch point interpretations that respectively describe zero, one or more touch points.

9. The computing device of claim 8, wherein the set of touch point interpretations further comprises one or more of a touch type describing a predicted type of user input object associated with each touch point and an estimated pressure of the touch at each touch point.

10. The computing device of claim 1, wherein the one or more predicted touch interpretations comprise a gesture interpretation that characterizes at least a portion of the first set of raw touch sensor data as a gesture determined from a predefined gesture class.

11. The computing device of claim 1, wherein the one or more predicted touch interpretations comprise a touch prediction vector that describes one or more predicted future locations of the one or more user input objects respectively for one or more future times.

12. The computing device of claim 1, wherein:
the machine-learned touch interpretation prediction model comprises at least one shared layer and multiple different and distinct output layers positioned structurally after the at least one shared layer; and
receiving, as an output of the touch interpretation prediction model, one or more predicted touch interpretations that describe predicted intentions of the one or more user input objects comprises receiving the one or more predicted touch interpretations from the multiple different and distinct output layers of the machine-learned touch interpretation prediction model.

13. One or more tangible, non-transitory computer-readable media storing computer-readable instructions that when executed by one or more processors cause the one or more processors to perform operations, the operations comprising:
obtaining data descriptive of a machine-learned touch interpretation prediction model, wherein the touch interpretation prediction model has been trained to receive touch sensor data indicative of one or more locations of one or more user input objects relative to a touch sensor at one or more times and, in response to receipt of the touch sensor data, provide simultaneous multiple predicted touch interpretation, each predicted touch interpretation corresponding to a different type of predicted touch interpretation based at least in part on the touch sensor data;
obtaining a first set of touch sensor data indicative of one or more user input object locations relative to a touch sensor over time;
inputting the first set of touch sensor data directly into the machine-learned touch interpretation prediction model;
receiving, as an output of the touch interpretation prediction model, simultaneous multiple predicted touch interpretations, each predicted touch interpretation describing a different predicted aspect of the one or more user input objects, wherein the simultaneous multiple predicted touch interpretations comprise at least first and second predicted touch interpretations determined from a group comprising a set of touch point interpretations that respectively describe one or more intended touch points, a gesture interpretation that characterizes the set of touch point interpretations as a gesture determined from a predefined gesture class, and a touch prediction vector that describes one or more predicted future locations of the one or more user input objects respectively for one or more future times; and
performing one or more actions associated with the multiple predicted touch interpretations.

14. The one or more tangible, non-transitory computer-readable media of claim 13, wherein the multiple predicted touch interpretations comprise at least a first predicted touch interpretation and a second predicted touch interpretation, the first predicted touch interpretation comprising a first one of a set of touch point interpretations, a gesture interpretation determined from a predefined gesture class, and a touch prediction vector for one or more future times, and the second predicted touch interpretation comprising a second one of a set of touch point interpretations, a gesture interpretation determined from a predefined gesture class, and a touch prediction vector for one or more future times, wherein the second one is different from the first one.

15. The one or more tangible, non-transitory computer-readable media of claim 13, wherein performing one or more actions associated with the multiple predicted touch interpretations comprises providing one or more of the multiple touch interpretations to an application via an application programming interface (API).

16. The one or more tangible, non-transitory computer-readable media of claim 13, wherein obtaining the first set of raw touch sensor data comprises obtaining the first set of raw touch sensor data associated with one or more fingers or hand portions of a user or a stylus operated by the user, the first set of raw touch sensor data descriptive of a location of the one or more fingers, hand portions or stylus relative to a touch-sensitive screen.

17. The one or more tangible, non-transitory computer-readable media of claim 13, wherein:
inputting the first set of touch sensor data into the machine-learned touch interpretation prediction model comprises inputting the first set of touch sensor data and a time vector descriptive of the one or more future times into a neural network associated with the machine-learned touch interpretation prediction model; and
receiving, as an output of the touch interpretation prediction model, multiple predicted touch interpretations comprises receiving one or more touch prediction vectors describing one or more predicted future locations of the one or more user input objects respectively for one or more future times as an output of the machine-learned touch interpretation prediction model.

18. A mobile computing device that determines touch interpretation from user input objects, comprising:
- a processor;
- at least one tangible, non-transitory computer-readable medium that stores instructions that, when executed by the at least one processor, cause the at least one processor to perform operations, the operations comprising:
  - obtaining data descriptive of a machine-learned touch interpretation prediction model that comprises a neural network, wherein the touch interpretation prediction model has been trained to receive raw touch sensor data indicative of one or more locations of one or more user input objects relative to a touch sensor at one or more times and, in response to receipt of the raw touch sensor data, output simultaneous multiple predicted touch interpretations, each predicted touch interpretation corresponding to a different type of predicted touch interpretation based at least in part on the touch sensor data, wherein the simultaneous multiple predicted touch interpretations comprise at least first and second predicted touch interpretations determined from a group comprising a set of touch point interpretations that respectively describe one or more intended touch points, a gesture interpretation that characterizes the set of touch point interpretations as a gesture determined from a predefined gesture class, and a touch prediction vector that describes one or more predicted future locations of the one or more user input objects respectively for one or more future times;
  - obtaining a first set of raw touch sensor data associated with the one or more user input objects, the first set of raw touch sensor data descriptive of a location of the one or more user input objects over time;
  - inputting the first set of raw touch sensor data directly into the machine-learned touch interpretation prediction model; and
  - receiving, as an output of the touch interpretation prediction model, simultaneous multiple predicted touch interpretations that describe a different predicted aspect of the one or more user input objects, wherein the simultaneous multiple predicted touch interpretations comprise at least first and second predicted touch interpretations determined from a group comprising a set of touch point interpretations that respectively describe one or more intended touch points, a gesture interpretation that characterizes the set of touch point interpretations as a gesture determined from a predefined gesture class, and a touch prediction vector that describes one or more predicted future locations of the one or more user input objects respectively for one or more future times; and
  - performing one or more actions associated with the multiple predicted touch interpretations.

19. The mobile computing device of claim 18, wherein the two or more predicted touch interpretations further comprise a touch prediction vector that describes one or more predicted future locations of the one or more user input objects respectively for one or more future times.

20. The mobile computing device of claim 18, wherein obtaining the first set of raw touch sensor data associated with the one or more user input objects comprises:
- obtaining the first set of raw touch sensor data that provides at least one value describing a change in the location of the one or more user input objects in an x dimension, at least one value describing a change in the location of the one or more user input objects in a y dimension, and at least one value describing a change in time; or
- obtaining the first set of raw touch sensor data that provides at least two values describing at least two locations of the one or more user input objects in the x dimension, at least two values describing at least two locations of the one or more user input objects in the y dimension, and at least two values describing at least two times.

* * * * *